(12) United States Patent
Kim et al.

(10) Patent No.: US 10,845,877 B2
(45) Date of Patent: Nov. 24, 2020

(54) APPARATUS AND METHOD OF FORMING LOCALIZED VIBRATION FIELD, AND METHOD OF DISPOSING EXCITERS

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Sung-joo Kim, Suwon-si (KR); Jeong-guon Ih, Daejeon (KR); Jong-bae Kim, Seoul (KR); Jung-han Woo, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/139,735

(22) Filed: Apr. 27, 2016

(65) Prior Publication Data

US 2016/0313796 A1     Oct. 27, 2016

Related U.S. Application Data

(60) Provisional application No. 62/153,153, filed on Apr. 27, 2015, provisional application No. 62/153,127, filed on Apr. 27, 2015.

(30) Foreign Application Priority Data

Apr. 6, 2016    (KR) ........................ 10-2016-0042389

(51) Int. Cl.
*H04R 17/10*     (2006.01)
*G06F 3/01*     (2006.01)
(Continued)

(52) U.S. Cl.
CPC ............... *G06F 3/016* (2013.01); *H04R 3/12* (2013.01); *H04R 17/10* (2013.01); *H04R 7/04* (2013.01);
(Continued)

(58) Field of Classification Search
CPC .......... G06F 3/016; H04R 3/12; H04R 17/10; H04R 2499/11; H04R 7/04; H04R 17/00; H04R 2400/03; H04R 2201/401
(Continued)

(56) References Cited

U.S. PATENT DOCUMENTS

| 4,514,599 A | 4/1985 | Yanagishima et al. |
| 4,551,849 A | 11/1985 | Kasai et al. |

(Continued)

FOREIGN PATENT DOCUMENTS

| EP | 0 936 842 B1 | 5/2004 |
| JP | 2001-513619 A | 9/2001 |

(Continued)

OTHER PUBLICATIONS

J. H. Hyun, et al., "Mode-Superposition for Vibration Localization of Thin Plate", Proceedings of the Korean Society for Noise and Vibration Engineering, pp. 13-14, Gyeongju (2009).
(Continued)

*Primary Examiner* — Vivian C Chin
*Assistant Examiner* — Con P Tran
(74) *Attorney, Agent, or Firm* — Sughrue Mion, PLLC

(57) ABSTRACT

An apparatus and a method of forming a localized vibration field are provided. The apparatus includes: a plate; a plurality of exciters disposed at a plurality of locations in neighborhood of circumference of the plate and configured to excite the plate; and a driving controller configured to vibrate the plurality of exciters by using a substantially same excitation frequency, wherein the plurality of exciters excite
(Continued)

a local region of the plate and suppress vibrations of a rest of regions except the local region of the plate.

15 Claims, 19 Drawing Sheets

(51) Int. Cl.
*H04R 3/12* (2006.01)
*H04R 17/00* (2006.01)
*H04R 7/04* (2006.01)

(52) U.S. Cl.
CPC ........ *H04R 17/00* (2013.01); *H04R 2201/401* (2013.01); *H04R 2400/03* (2013.01); *H04R 2499/11* (2013.01)

(58) Field of Classification Search
USPC .................................. 381/333, 98, 177, 71.1
See application file for complete search history.

(56) References Cited

U.S. PATENT DOCUMENTS

| | | | |
|---|---|---|---|
| 5,433,211 A * | 7/1995 | Brammer | A61B 5/0051 600/552 |
| 8,854,340 B2 | 10/2014 | Wu et al. | |
| 2001/0019617 A1 | 9/2001 | Morecroft | |
| 2005/0002537 A1 | 1/2005 | Azima et al. | |
| 2007/0213645 A1* | 9/2007 | Zumeris | A61H 23/0236 601/46 |
| 2009/0141915 A1 | 6/2009 | Ko et al. | |
| 2009/0196455 A1 | 8/2009 | Lee | |
| 2011/0090167 A1* | 4/2011 | Harris | G06F 3/016 345/173 |
| 2012/0162113 A1 | 6/2012 | Lee | |
| 2012/0183162 A1 | 7/2012 | Chabanne et al. | |
| 2012/0242593 A1 | 9/2012 | Kim et al. | |
| 2012/0313874 A1* | 12/2012 | Chappaz | G06F 3/041 345/173 |
| 2013/0127755 A1 | 5/2013 | Lynn et al. | |
| 2015/0003648 A1 | 1/2015 | Kang | |
| 2015/0169058 A1* | 6/2015 | Harris | G06F 3/041 345/173 |

FOREIGN PATENT DOCUMENTS

| | | |
|---|---|---|
| JP | 5225247 B2 | 7/2013 |
| KR | 10-2001-0072042 A | 7/2001 |
| KR | 10-2009-0058223 A | 6/2009 |
| KR | 10-2009-0079292 A | 7/2009 |
| KR | 10-2012-0014538 A | 2/2012 |
| KR | 10-1125510 B1 | 3/2012 |
| KR | 10-2012-0055179 A | 5/2012 |
| KR | 10-2012-0074831 A | 7/2012 |
| KR | 10-2012-0075064 A | 7/2012 |
| KR | 10-2012-0108315 A | 10/2012 |
| KR | 10-2012-0118675 A | 10/2012 |
| KR | 10-2014-0079488 A | 6/2014 |
| KR | 10-2014-0125540 A | 10/2014 |
| KR | 10-2015-0001521 A | 1/2015 |
| WO | 99/08479 A1 | 2/1999 |

OTHER PUBLICATIONS

M. R. Bai, et al., "Impact Localization Combined With Haptic Feedback for Touch Panel Applications Based on the Time-Reversal Approach," Journal of the Acoustical Society of America, vol. 129, No. 3, Mar. 2011, pp. 1297-1305.

J. C. Craig, "Difference Threshold for Intensity of Tactile Stimuli," Perception & Psychophysics, 1972, vol. 11, pp. 150-152.

S.J. Bolanowski, Jr., et al., "Four Channels Mediate the Mechanical Aspects of Touch," Journal of the Acoustical Society of America vol. 84, No. 5, Nov. 1988, pp. 1680-1694.

L. Yao, et al., "Sensor Placement for On-Orbit Modal Identification of Large Space Structures via a Genetic Algorithm", 1992 IEEE, pp. 332-335.

M. S. Bai, et al., "Practical Implementation", Acoustic Array Systems: Theory, Implementation, and Application, John Wiley & Sons, Inc., Singapore, 2013, pp. 211-213.

* cited by examiner

APPARATUS AND METHOD OF FORMING LOCALIZED VIBRATION FIELD, AND METHOD OF DISPOSING EXCITERS

CROSS-REFERENCE TO RELATED APPLICATIONS

This application claims the benefit of U.S. Provisional Application No. 62/153,127, filed on Apr. 27, 2015, and U.S. Provisional Application No. 62/153,153, filed on Apr. 27, 2015, in the U.S. Patent and Trademark Office, and priority to Korean Patent Application No. 10-2016-0042389, filed on Apr. 6, 2016, in the Korean Intellectual Property Office, the disclosures of which are incorporated herein in their entireties by reference.

BACKGROUND

1. Field

The present disclosure relates to apparatuses and methods of forming a localized vibration field which form the localized vibration field on a plate by disposing exciters on the plate such as a display panel, and methods of disposing the exciters of the apparatuses for forming the localized vibration field.

2. Description of the Related Art

To implement haptic sensation at an electronic device such as a smartphone or a tablet personal computer (PC), various technologies are used. One of the most general technologies used for implementing haptic sensation is a spinning motor having an off-center weight which vibrates an entire electronic apparatus. In a touchscreen type electronic apparatus, this technology is used for implementing a sense of pressing a physical button/key. For example, when a user touches a button displayed on a touchscreen display, an entire electronic apparatus vibrates by rotating a motor for a short time.

Also, for portability, space utilization, and an esthetic sense, an electronic apparatus such as a smartphone or a tablet PC provides an image via a thin display panel having a small frame (or bezel) if possible. Due to a thin thickness and a small frame width of the apparatus, only small speakers may be mounted, but it is difficult to provide mid/low frequency sounds by using only the small speakers. Therefore, if an external sound apparatus is not separately connected, there are limitations in providing natural and affluent sounds by using only the apparatus.

SUMMARY

Provided are apparatuses for providing a vibration field pattern on a localized region of an appearance of an electronic apparatus.

Provided are apparatuses for forming a vibration field pattern that may feel haptic sensation on a local region of an appearance of an electronic apparatus.

Provided are methods of disposing exciters which dispose the exciters forming a vibration field pattern on a local region of an appearance of an electronic apparatus.

Provided are methods and apparatuses of providing affluent sounds including mid/low frequencies to an electronic apparatus.

Additional aspects will be set forth in part in the description which follows and, in part, will be apparent from the description, or may be learned by practice of the presented embodiments.

According to an aspect of an embodiment, an apparatus for forming a localized vibration field, the apparatus includes: a plate; a plurality of exciters disposed at a plurality of locations in neighborhood of circumference of the plate and configured to excite the plate; and a driving controller configured to vibrate the plurality of exciters by using a substantially same excitation frequency, wherein the plurality of exciters excite a local region of the plate and suppress vibrations of a rest of regions except the local region of the plate.

According to an aspect of another embodiment, a method of forming a localized vibration field, the method includes: disposing a plurality of exciters at a plurality of locations in neighborhood of circumference of a plate; and exciting the plate by vibrating the plurality of exciters with a substantially same excitation frequency, wherein the exciting of the plate includes exciting a local region of the plate and suppressing vibration of a rest of regions except the local region of the plate.

According to an aspect of another embodiment, a method of disposing exciters which vibrate a local region of a plate by exciting the plate at a plurality of locations in neighborhood of circumference of the plate, the method includes: exciting a plurality of candidate locations in the neighborhood of the circumference of the plate by using a same excitation frequency; selecting relatively independent candidate locations with respect to localized vibration of the plate by calculating correlation between the localized vibration of the plate and vibrations at the plurality of candidate locations; and disposing the exciters at the selected independent candidate locations.

An apparatus for forming a localized vibration field according to an embodiment may form a vibration field pattern on a local region of an appearance of an electronic apparatus.

An apparatus for forming a localized vibration field according to an embodiment may allow haptic sensation to be felt on a local region of an appearance of an electronic apparatus.

An apparatus for forming a localized vibration field according to an embodiment may provide affluent sounds including frequencies in a mid range or a low range from among an audible frequency band to an electronic apparatus.

A method of disposing exciters according to an embodiment may optimally dispose exciters forming a vibration field pattern on a local region of an appearance of an electronic apparatus.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Terms used herein will be described in brief prior to a detailed description of the exemplary embodiments.

As the terms used herein, so far as possible, widely-used general terms are selected in consideration of functions in the exemplary embodiments; however, these terms may vary according to the intentions of those of ordinary skill in the art, the precedents, or the appearance of new technology. Also, in some cases, there may be terms that are arbitrarily selected by the applicant, and the meanings thereof will be described in detail in the corresponding portions of the description of the exemplary embodiments. Therefore, the terms used herein are not simple titles of terms and should be defined based on the meanings thereof and the overall description of the exemplary embodiments.

Throughout the specification, when a portion "includes" an element, another element may be further included, rather than excluding the existence of the other element, unless otherwise described.

Embodiments are described below in detail with reference to the accompanying drawings to enable a person of ordinary skill in the art to easily carry out the embodiments. However, the exemplary embodiments may be implemented in various different forms, and is not limited to the embodiments described therein. Also, for clear description of the exemplary embodiments, portions irrelevant to the description are omitted from the drawings.

Figure 1:
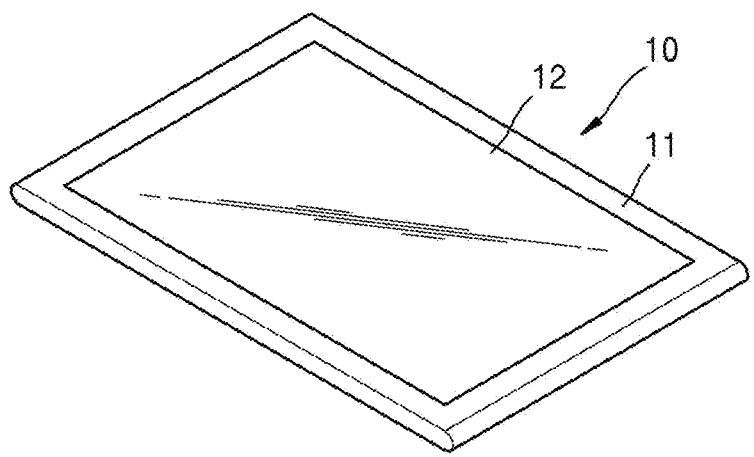
FIG. 1 is a view illustrating an appearance of an electronic apparatus that includes an apparatus for forming a localized vibration field according to an embodiment.
Figure 2:
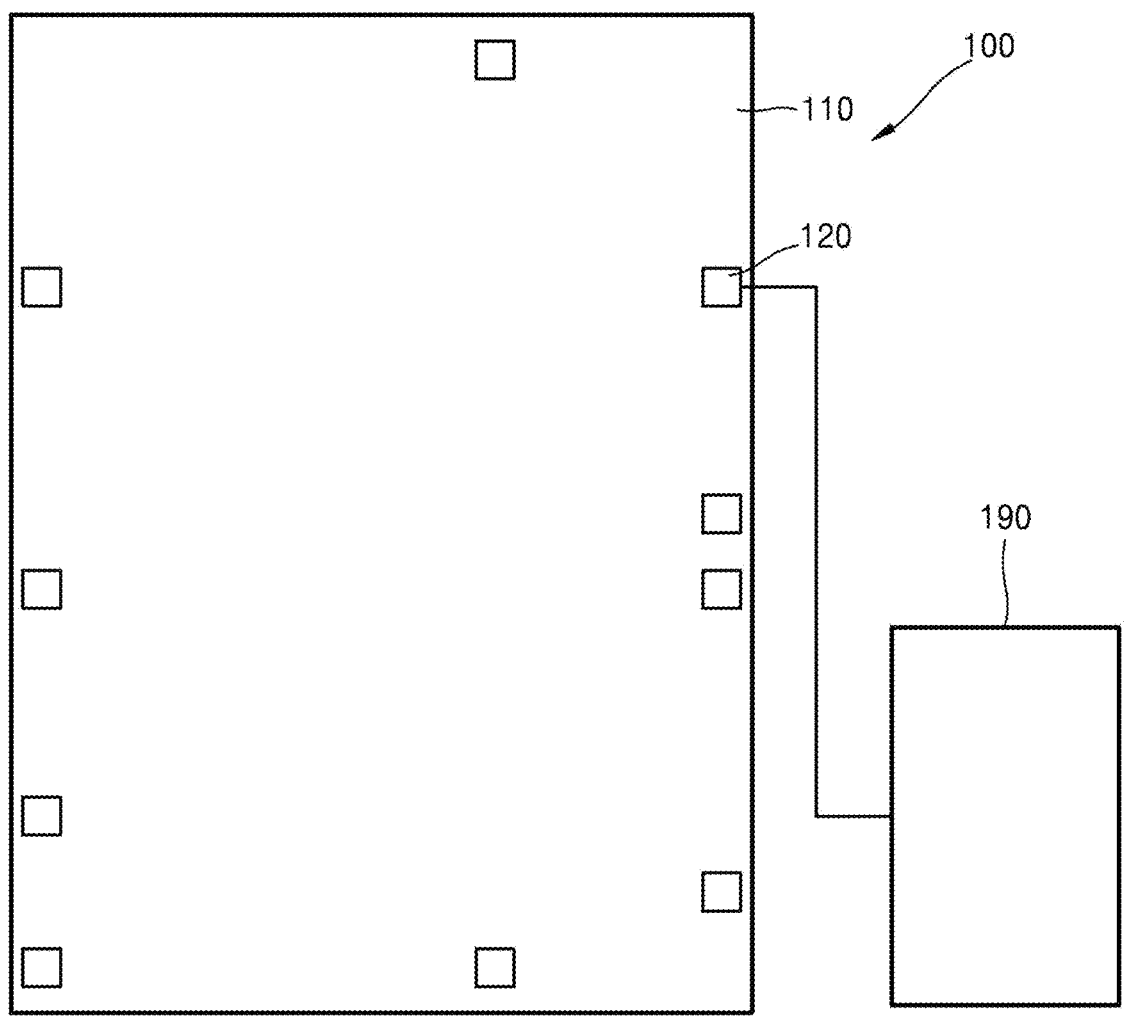
FIG. 2 is a view illustrating an apparatus for forming a localized vibration field according to an embodiment.
Figure 3:
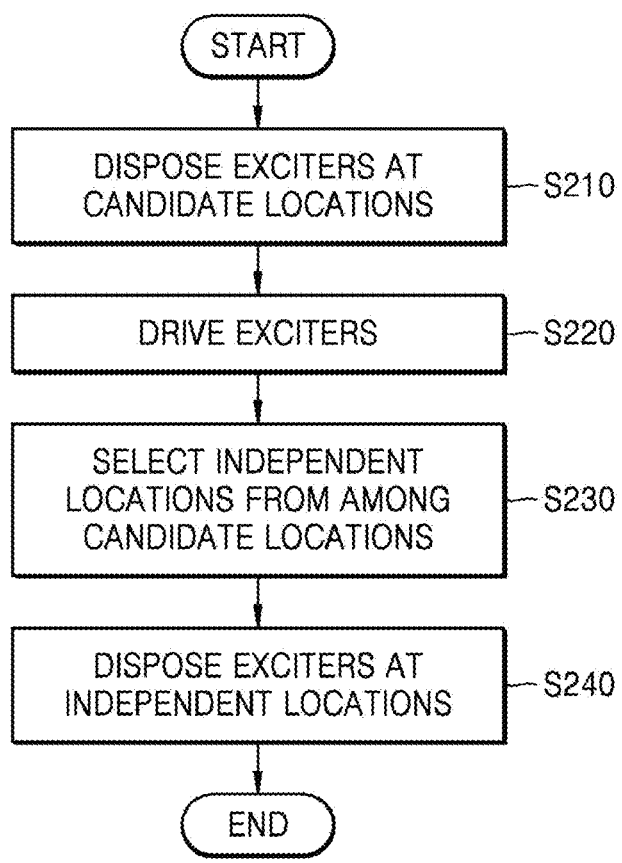
FIG. 3 is a flowchart for explaining a method of disposing exciters.

FIG. 1 is a view illustrating an appearance of an electronic apparatus 10 that includes an apparatus 100 for forming a localized vibration field according to an embodiment, FIG. 2 is a plan view illustrating the apparatus 100 for forming a localized vibration field according to an embodiment, and FIG. 3 is a flowchart for explaining a method of disposing exciters.

Referring to FIG. 1, the electronic apparatus 10 may be an information & communication technology (ICT) apparatus such as a smartphone or a tablet personal computer (PC). As illustrated in FIG. 1, the electronic apparatus 10 may include a housing 11 and a display panel 12. The housing 11 may have a plate shape. The display panel 12 may be located above one side of the housing 11.

Referring to FIG. 2, the apparatus 100 for forming a localized vibration field according to an embodiment may include a plate 110, a plurality of exciters 120, and a driving controller 190.

The plate 110 may include a material that may be excited. The plate 110 may be a portion of the electronic apparatus 10 described with reference to FIG. 1. For example, the plate 110 may be understood as the display panel 12 of the electronic apparatus 10 of FIG. 1. As understood by a person of ordinary skill in the art, the plate 110 may have a flat panel shape but is not limited thereto. For example, the plate 110 may have a curved panel shape.

The plurality of exciters 120 are disposed in the neighborhood of the circumference of the plate 110 and excite the plate 110. The neighborhood of the circumference of the plate 110 denotes the outer boundary or its neighborhood of the plate 110. For example, the plurality of exciters 120 may be disposed on the backside of the display panel 12 of the electronic apparatus 10 described with reference to FIG. 1. As described below, the plurality of exciters 120 may be disposed such that vibrations occur on local regions and vibrations are suppressed on the rest of regions when the plate 110 vibrates. That is, the plurality of exciters 120 form a vibration pattern so that haptic sensation is certainly felt only on portions touched by a hand or a specific region on the plate 110. As described below, the plurality of exciters 120 may be disposed on only locations that independently contribute to the vibration field pattern. A method of disposing the plurality of exciters 120 is described below.

The exciter 120 may be, for example, a piezoelectric element. The piezoelectric element is formed by disposing electrodes on an upper surface and a lower surface of a piezoelectric single crystal, and induces vibration from a thickness change of the piezoelectric single crystal in response to a signal voltage applied to the electrodes.

The driving controller 190 drives the plurality of exciters 120 so that the exciters 120 vibrate at the substantially same excitation frequency. The excitation frequency may be selected within a frequency band in which haptic sensation by vibration is sensitive. The driving controller 190 may independently drive each of the plurality of exciters 120 such that amplitudes and phases of the plurality of exciters 120 are different from each other.

Next, a method of disposing the exciters 120 according to an embodiment is described with reference to FIGS. 3 and 4.

Figure 4:
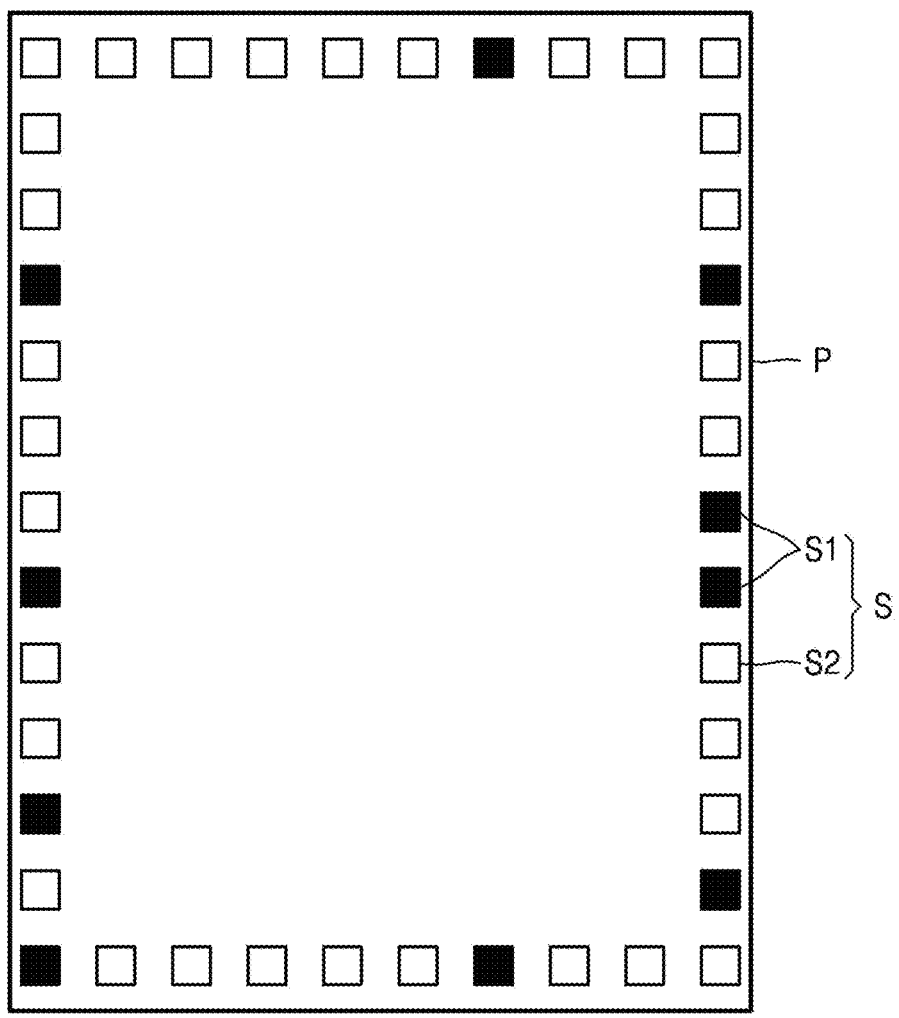
FIG. 4 is a view illustrating independent locations from among a plurality of candidate locations of a plate.

As illustrated in FIG. 4, the exciters 120 are disposed at a plurality of candidate locations S in the neighborhood of the circumference of the plate 110 first (S210), and the exciters 120 are driven at the same excitation frequency (S220). As illustrated in FIG. 4, a transfer matrix may be obtained from relation between an electric input signal input to the exciters 120 and a velocity response at a measurement point by attaching thirty four small moving coil-type exciters 120 at the boundary of an reinforced glass panel P, and detecting a vibration velocity at seventy seven internal measurement points by using a laser Doppler Vibrometry (LDV). Here, the reinforced glass panel P is used as the display panel 11 (see FIG. 1), and may be understood as the plate 110 according to an embodiment. An input signal of each exciter 120 required for control may be obtained by using an eigen-function expansion method or an inverse problem method via a bending traveling wave control. A transfer matrix between the exciters 120 and a vibration field used for the inverse problem may be decomposed by using singular value decomposition (SVD). The singular value decomposition decomposes an orthogonal square matrix into a diagonal matrix with an eigen value used as a basis by using a spectrum theory.

Next, relatively independent locations S2 are selected with respect to localized vibration of the plate 110 by calculating correlation between the localized vibration of the plate 110 and vibrations at the plurality of candidate locations S (S230). In this case, independence between the exciters 120 may be determined depending on a square value of a singular vector obtained via a singular value decomposition method. Excitation at the rest of locations S1 except the independent locations S2 may be derived via a combination of excitations at the independent locations S2.

As an embodiment for obtaining a signal to be input to the exciters 120, the eigen-function expansion method is described below.

A response of a structure receiving external force may be expressed by configuring a mode variable representing a vibration characteristic of a system and using Equations 1 and 2 that use the eigen-function expansion as follows.

$$v(x, y) = \sum_{n=1}^{\infty} A_i \psi_n^i \frac{j\omega}{\Lambda_n\{\omega_n^2(1+j\eta_n) - \omega^2\}} - \psi_n(x, y), \quad \text{Equation 1}$$

$$\gamma_n(x, y) = \frac{j\omega}{\Lambda_n\{\omega_n^2(1+j\eta_n) - \omega^2\}} - \psi_n(x, y) \quad \text{Equation 2}$$

Here, n is the degree of a mode, $A_i$ is weight of an l-th exciter 120, $\Lambda_n$ is a norm of an n-th mode, $\omega_n$ is an eigen frequency, $\psi_n$ is an eigen function, $\psi_n^i$ is an eigen-function value at an excitation point, $\eta_n$ and is a loss coefficient. The same vibration field for each mode is defined as $\gamma_n$. A response depending on a contribution degree for each mode may be expressed by Equations 3 and 4 by using orthogonality of eigen functions.

$$v(x, y) = \sum_{n=1}^{\infty} B_n \psi_n(x, y) = \sum_{n=1}^{\infty} W_n \gamma_n(x, y), \quad \text{Equation 3}$$

$$B_n = \int_S v(x, y) \psi_n(x, y) dS \quad \text{Equation 4}$$

Here, $W_n$ is a contribution degree of an n-th mode. A contribution degree for each mode in an objective vibration field may be obtained by using Equations 3 and 4. To implement a desired objective vibration field, a desired contribution degree for each mode may be implemented by giving appropriate weight of the exciter 120 to the exciters 120 including an array disposed on a boundary. A response in the case where N exciters 120 are used may be known from Equation 1, and Equation 5 may be obtained by using a contribution degree for each mode of a vibration field which aims at the response.

$$\sum_{i=1}^{N} (A_i \psi_n^i) = W_n, \quad \text{Equation 5}$$

$$n = 1, 2, \ldots, m$$

A relation equation of weight of the exciter 120 and a contribution degree for each mode may be expressed in terms of a matrix equation, and weight that may obtain a vibration field, which is our object, may be obtained by Equations 6 and 7.

$$\psi_{m \times N} A_{N \times 1} W_{m \times 1}, \quad \text{Equation 6}$$

$$A_{N \times 1} = \Psi_{N \times m}^\dagger W_{m \times 1} \quad \text{Equation 7}$$

Here, A is weight of the exciter 120, W is a mode contribution degree, ψ is a transfer matrix between A including modal information and W, and † is a pseudo-inverse matrix.

For another embodiment for obtaining a signal to be input to exciters, a bending traveling wave controlling method is described below.

When excitation occurs at a certain location inside a structure, a bending traveling wave propagates. When N exciters 120 and response information measured at p measurement points therefrom are given, a matrix equation of Equation 8 may be expressed.

$$G_{p \times N} E_{N \times 1} V_{p \times 1} \quad \text{Equation 8}$$

Here, a matrix G uses a frequency response function measured via experiment as a transfer matrix between an input signal of the exciter 120 and a velocity response. E is an input signal of the exciter 120, and V is a velocity matrix at a measurement point. An input signal E of the exciter 120 may be obtained via the inverse-problem technique by using a transfer matrix and an objective vibration field.

$$E_{N \times 1} = G_{N \times p}^\dagger V_{p \times 1} \quad \text{Equation 9}$$

Furthermore, a vibration field which approximates to a desired objective vibration field may be obtained by applying the Tikhonov normalizaiton method as in Equations 10 and 11 below.

$$J = [V - GE_F]^H [V - GE_F] + \beta_F^H E_F \quad \text{Equation 10}$$

$$E_F = [G^H G + \beta I]^{-1} G^H V \quad \text{Equation 11}$$

Here, J is a price function for taking into account input power, $E_F$ is an input signal, and H is the Hermite operator. Weight β may be obtained by using a generalized cross validation (GCV) function. Through the normalization, it is revealed that power less than input power of the exciter 120 of the case where the normalization has not been performed may be used.

Next, a method of selecting relatively independent locations in the plurality of candidate locations S of the plate 110 is described below.

When only the exciters 120 having linearly independent relation are selected from among the exciters 120, selecting and using unnecessary exciters 120 may be reduced. As a method of selecting independent relation, an effective independent method (Efl) may be used. When this method is used, linearly independent relations of candidate groups of the exciters 120 disposed at different locations are known and optimized arrangement may be found.

For example, the eigen-function expansion method uses a transfer matrix ψ in Equation 6, which is a matrix equation including weight of the exciter 120 and a contribution degree for each mode, and a linear independent value Efl, which is a factor representing independency on a system, may be expressed by Equation 12.

$$E_f = \text{diag}[\psi(\psi^H \psi)^{-1} \psi] \quad \text{Equation 12}$$

Alternatively, in the bending traveling wave controlling method, when a transfer matrix between weight of the exciter 120 and a velocity response is used, a linear independent value Efl may be expressed by Equation 13.

$$E_f = \text{diag}[G(G^H G)^{-1} G] \quad \text{Equation 13}$$

When the SVD is applied to the above-obtained value, a decomposed Efl value is expressed by Equation 14.

$$E_f = \text{diag}[U_n U_n^H] \quad \text{Equation 14}$$

Independence between the exciters 120 may be determined depending on the square magnitude of a singular vector obtained by Equation 14. A valid independent location is selected by removing a location of an exciter 120 having a smallest value, so that locations of most mutually independent exciters 120 with respect to a given number of the exciters 120 are optimally selected. Also, when an error is defined in advance, a minimum number and optimized arrangement of the exciters 120 required for forming a vibration field may be known.

Based on independence between the exciters 120, optimized arrangement of a specific number of the exciters 120 for excitation, or a minimum number of the exciters 120 for optimized excitation may be provided. In a method of disposing exciters according to an embodiment, miniaturization of an apparatus for forming a localized vibration field, which has been difficult to implement due to limitation of a number of available exciters 120, is possible.

Next, a method of forming a localized vibration field is described with reference to the apparatus 100 for forming a localized vibration field according to an embodiment.

The apparatus 100 for forming a localized vibration field implements localization of vibration by using the plurality of exciters 120 disposed on the display panel 10 and the plate 110 of the electronic apparatus. For this purpose, an objective vibration field pattern is selected based on a frequency and an amplitude in which haptic sensation by vibration is most sensitive, vibration is generated in the form of standing waves, and also an object achievement degree factor of appraising implementation results accordingly may be used. Also, through understanding of independence between the exciters 120, locations of most mutual independent exciters 120 are optimally selected with respect to a given number of the exciters 120, so that a minimum number and optimized arrangement of the exciters 120 required for forming a vibration field may be known.

To implement an objective vibration pattern generally including a vibration haptic sensation implementation region having a large amplitude and a non-vibration region having no haptic sensation and a small amplitude on the display panel 10, a frequency, an amplitude, and/or a size of haptic sensation difference limen which take into account sensitivity of haptic sensation may be selected. Also, an objective achievement degree regarding forming of a vibration haptic sensation implementation region and a non-vibration region having no haptic sensation may be made and used as an appraisal value by using the frequency, the amplitude, and/or the size of haptic sensation difference limen.

Figure 5:
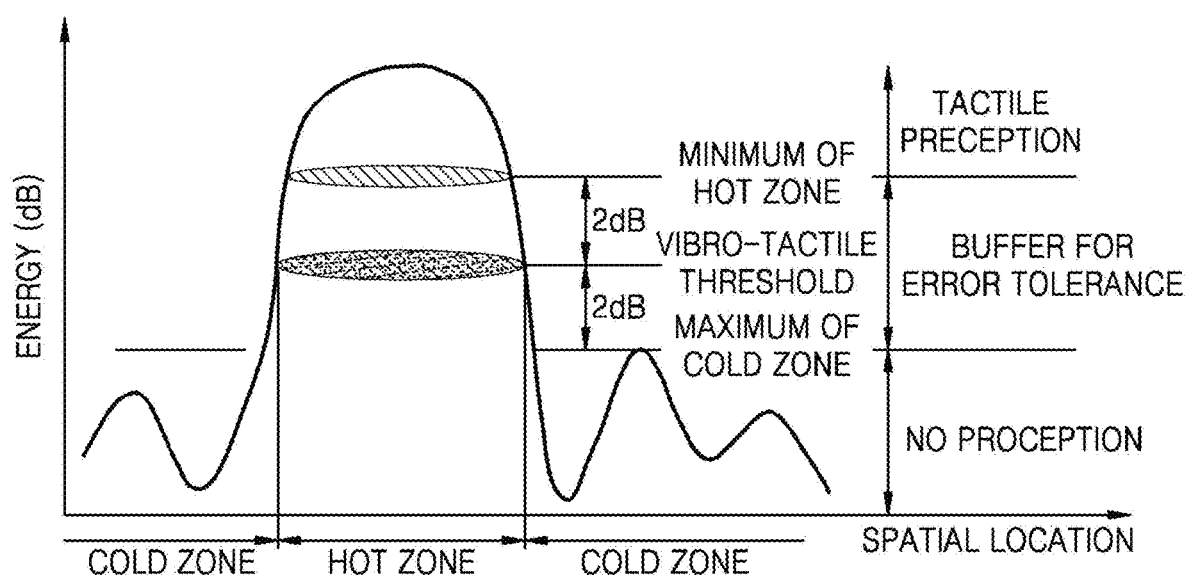
FIG. 5 is a graph illustrating relation between a vibration velocity and a person's haptic recognition.
Figure 6:
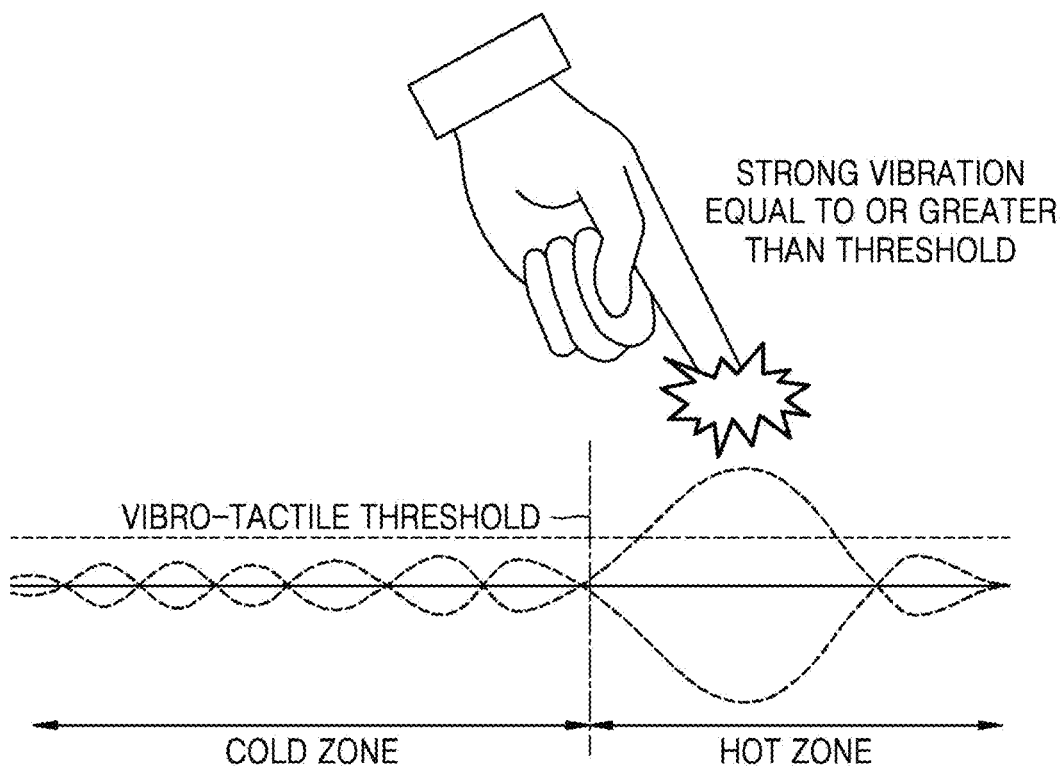
FIG. 6 is a diagram illustrating an operation of forming a localized vibration field at the apparatus for forming the localized vibration field of FIG. 2.

FIG. 5 is a graph illustrating relation between a vibration velocity and a person's haptic recognition, and FIG. 6 is a diagram illustrating an operation of forming a localized vibration field at a plate. As illustrated in FIGS. 5 and 6, an objective vibration field pattern includes a vibration haptic sensation implementation region (referred to as a hot zone), where a strong vibration haptic sensation may be felt, and a non-vibration region having no haptic sensation (referred to as a cold zone), where haptic sensation is not felt by suppressing vibration. By taking into account recognition information for a human finger's haptic sensation, maximum energy of the cold zone may be allowed to have a difference of about 2 dB or more, which is a size of a difference limen, compared to a vibro-tactile threshold, and likewise, minimum energy of the hot zone may be allowed to have a difference of about 2 dB or more. The objective vibration field may be implemented as in FIG. 6. The vibro-tactile threshold may change more or less depending on an excitation frequency. For efficiency of an input electric signal and providing an effective sense of vibration, excitation may be performed by using a frequency in the neighborhood of about 300 Hz where a vibro-tactile threshold by vibration is minimum or a signal in a narrow band (for example, a signal in a band ranging from about 250 Hz to about 350 Hz) which uses such a frequency as a central frequency.

In an embodiment, a success ratio S for appraising a result of the objective vibration field based on haptic sensation information by vibration such as a threshold and a difference limen is defined as an achievement degree factor. Maximum energy of the cold zone in which velocity response values measured from the hot zone, which is the objective entire region, and the cold zone are a condition based on a threshold and a difference limen, is allowed to have a difference of about 2 dB or more, which is a size of a difference limen, and likewise, minimum energy of the hot zone is allowed to have a difference of about 2 dB or more.

Figure 7:
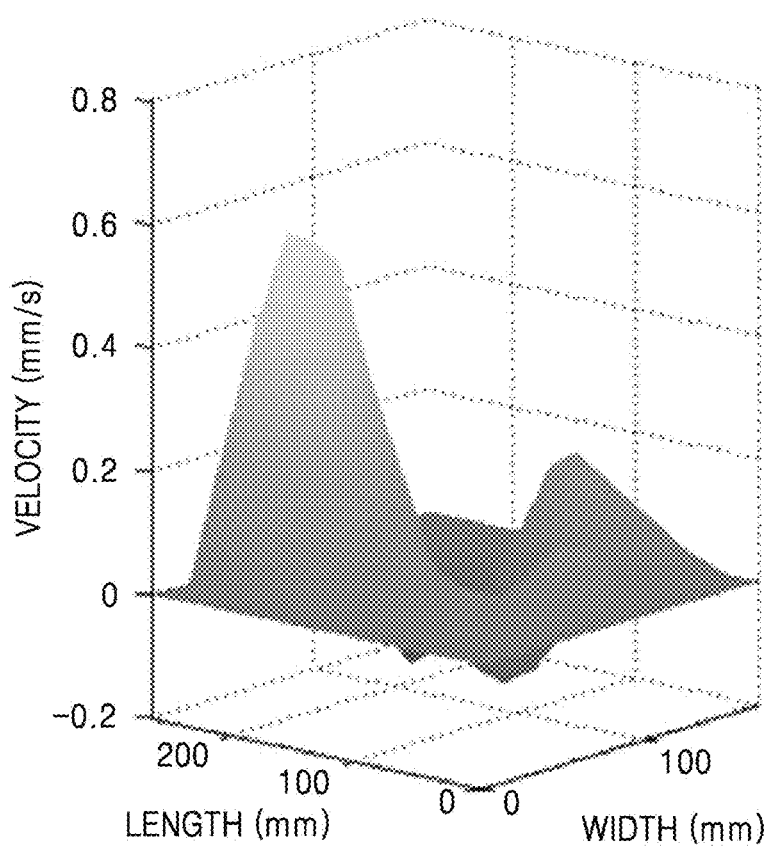
FIGS. 7, 8, 9, and 10 are graphs illustrating implementation results of a localized vibration field formed by a method of forming a localized vibration field according to an embodiment.
Figure 8:
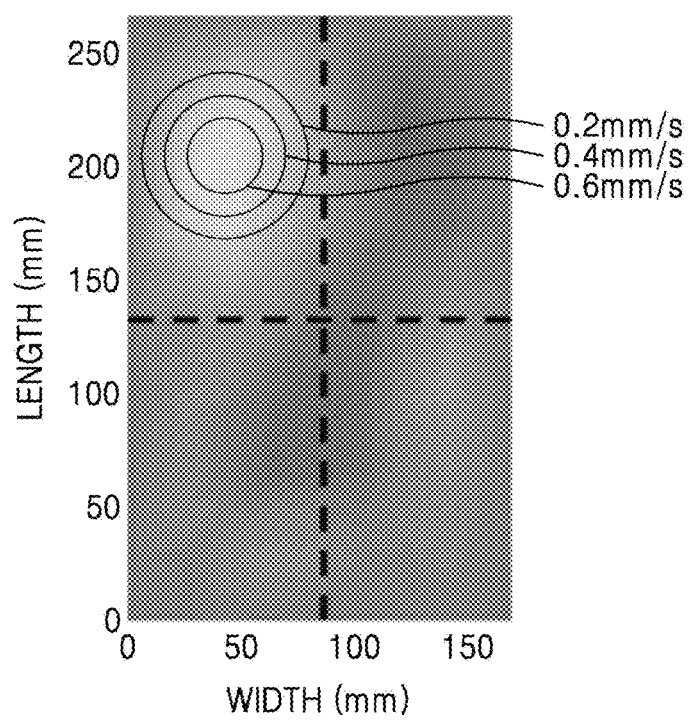
Figure 9:
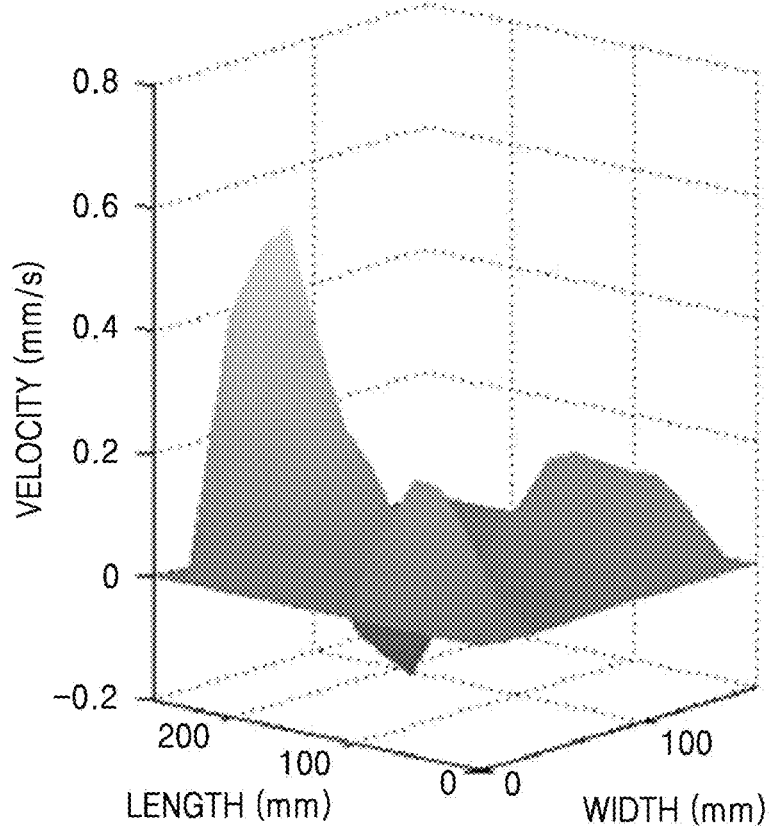
Figure 10:
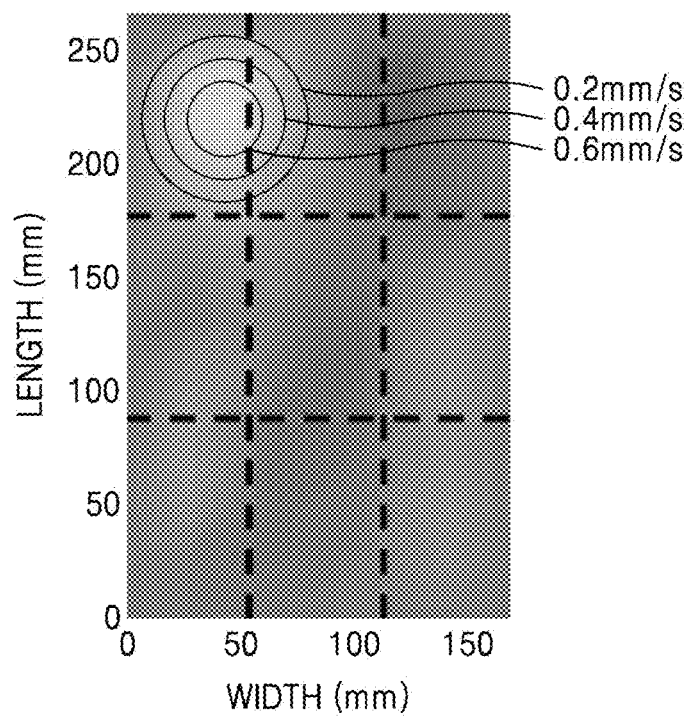

FIGS. 7 to 10 illustrate implementation results of a localized vibration field in the case where an eigen-function expansion method is used as a method of forming a localized vibration field according to an embodiment. FIGS. 7 and 8 illustrate implementation results of a localized vibration field applied to 2×2 divided regions, and FIGS. 9 and 10 illustrate implementation results of a localized vibration field applied to 3×3 divided regions.

A region in which a vibration velocity is less than about 0.2 mm/s corresponds to the cold zone in which vibration cannot be recognized. A region in which a vibration velocity is equal to or greater than about 0.2 mm/s corresponds to the hot zone. The velocity of about 0.2 mm/s may be understood as a vibro-tactile threshold. Referring to FIGS. 7 and 8, it is known that the hot zone in which a vibration velocity is equal to or greater than about 0.2 mm/s is locally limited to a left upper region from among the 2×2 divided regions. In this case, the success ratio S is calculated as about 90.2%. As understood by a person of ordinary skill in the art, a vibration velocity of about 0.4 mm/s or more may provide more definite vibration, and this hot zone, as illustrated in FIGS. 9 and 10, may be locally limited in the 3×3 divided regions. In the case where the localized vibration field is applied to the 3×3 divided regions, a success ratio S is measured as about 86.5%.

Figure 11:
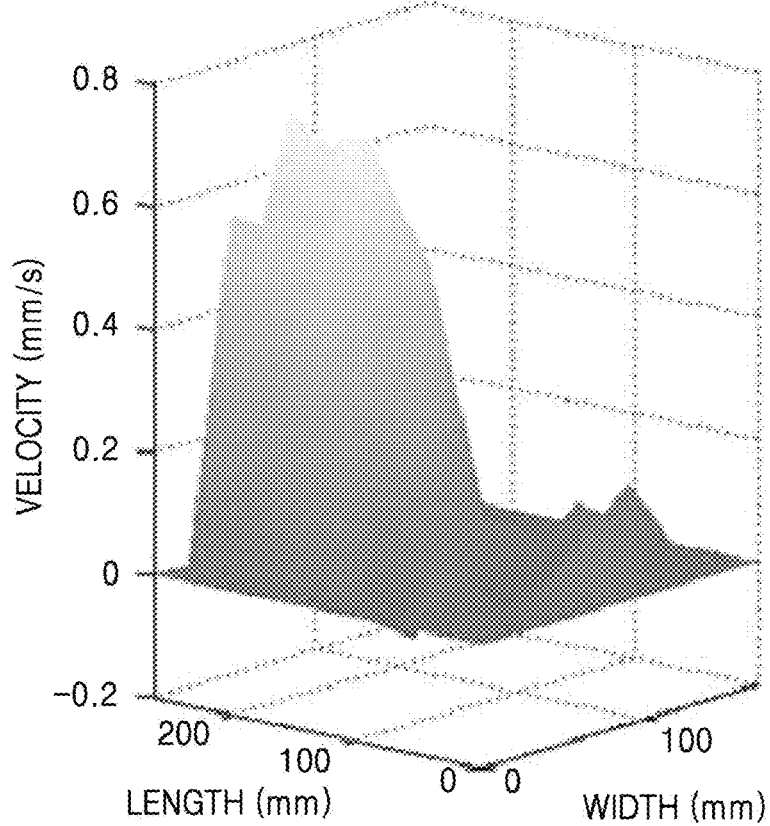
FIGS. 11 and 12 are graphs illustrating implementation results of a localized vibration field formed by a method of forming a localized vibration field according to another embodiment.
Figure 12:
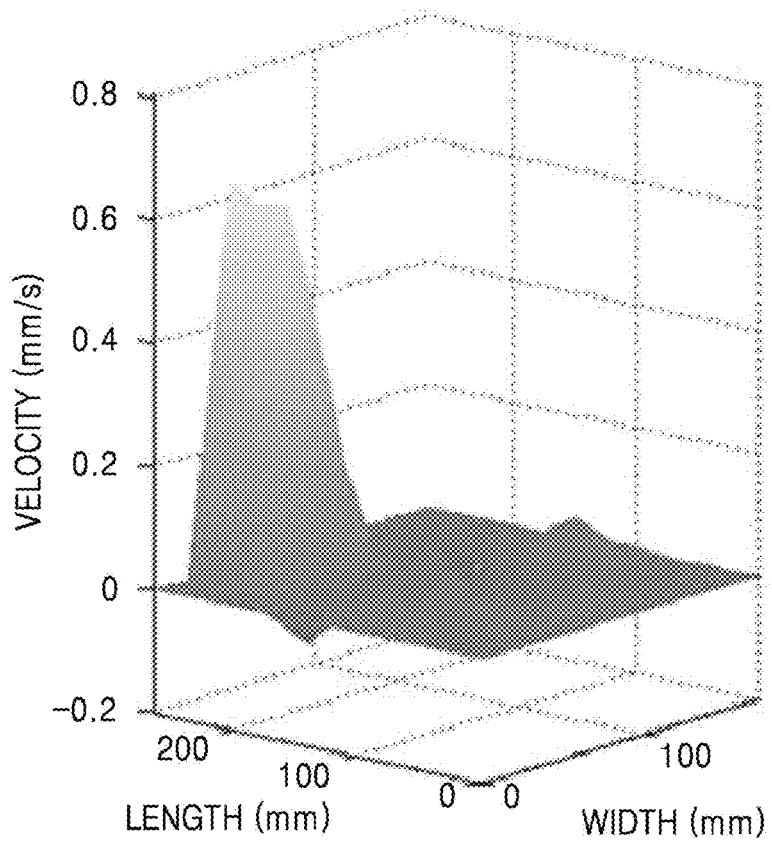

FIGS. 11 and 12 illustrate implementation results of a localized vibration field in the case where a bending traveling wave controllling method (normalizaiton not used) is used as a method of forming a localized vibration field according to an embodiment. FIG. 11 illustrates implementation results of a localized vibration field applied to 2×2 divided regions, and FIG. 12 illustrates implementation results of a localized vibration field applied to 3×3 divided regions. Referring to FIG. 11, in the case where the localized vibration field is applied to the 2×2 divided regions, a success ratio S is measured as about 97.4%. Referring to FIG. 12, in the case where the localized vibration field is applied to the 3×3 divided regions, a success ratio S is measured as about 98.7%.

Figure 13:
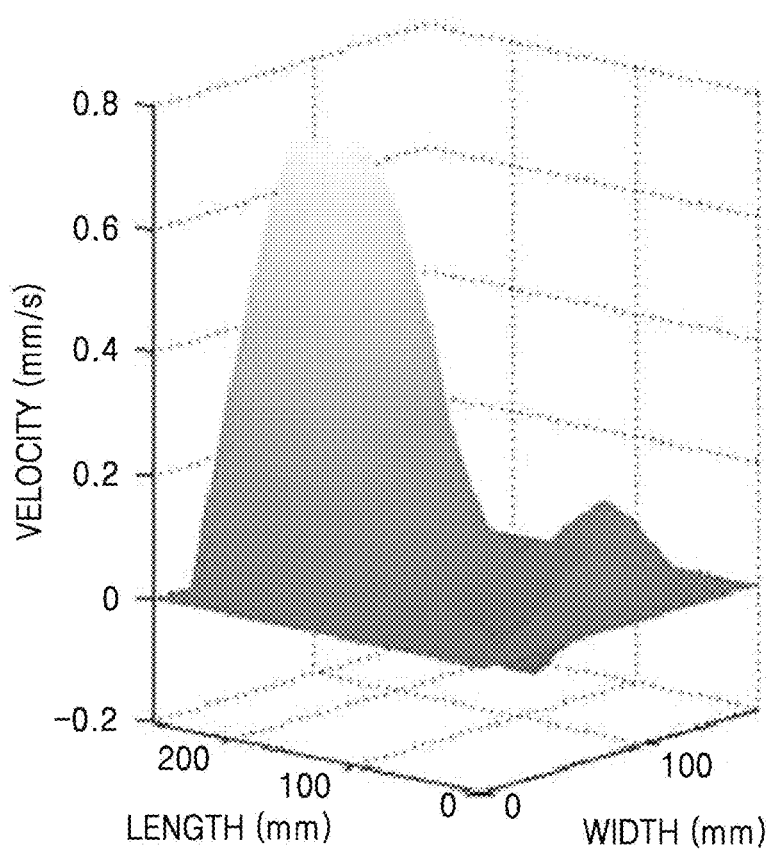
FIGS. 13 and 14 are graphs illustrating implementation results of a localized vibration field formed by a method of forming a localized vibration field according to another embodiment.
Figure 14:
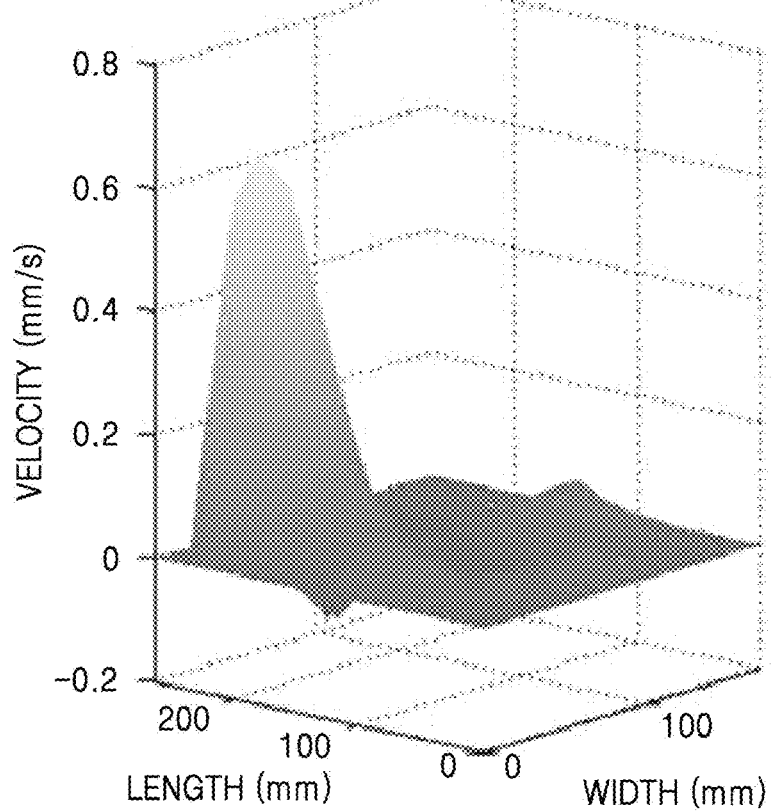

FIGS. 13 and 14 illustrate implementation results of a localized vibration field in the case where a bending traveling wave controllling method (normalizaiton not used) is used as a method of forming a localized vibration field according to another embodiment. FIG. 13 illustrate implementation results of a localized vibration field applied to 2×2 divided regions, and FIG. 14 illustrate implementation results of a localized vibration field applied to 3×3 divided regions. Referring to FIG. 13, in the case where the localized vibration field is applied to the 2×2 divided regions, a success ratio S is measured as about 98.7%. Referring to FIG. 14, in the case where the localized vibration field is applied to the 3×3 divided regions, a success ratio S is measured as about 98.7%.

Though the above embodiments describe a case where the apparatus 100 for forming a localized vibration field is prepared on the display panel 10 of an information & communication technology (ICT) apparatus, the apparatus 100 for forming a localized vibration field is not limited thereto. For another example, a plurality of exciters 120 may be disposed on the circumference of the backside of the ICT apparatus (that is, the backside of the display panel 10). For another example, as understood by a person of ordinary skill in the art, in the case where the ICT apparatus does not include the display panel 10, the plurality of exciters 120 may be installed on a plate having a predetermined area.

Figure 15:
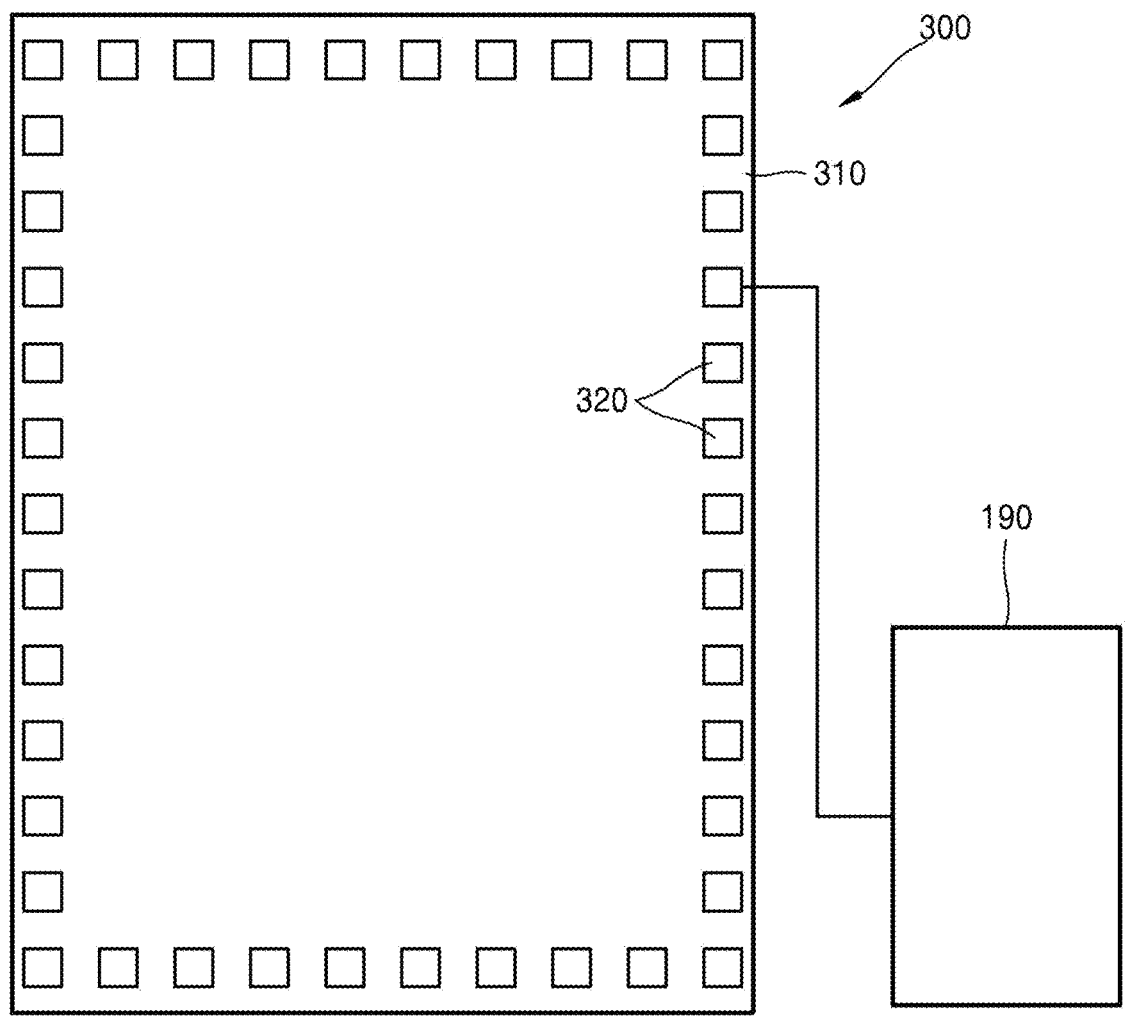
FIG. 15 is a view illustrating an apparatus for forming a localized vibration field according to another embodiment.

FIG. 15 is a view illustrating an apparatus 300 for forming a localized vibration field according to another embodiment.

Referring to FIG. 15, the apparatus 300 for forming a localized vibration field may include a plate 310, a plurality of exciters 320, and a driving controller 390.

The plate 310 may include a material that may be excited. The plate 310 may be a portion of the electronic apparatus 10 described with reference to FIG. 1. For example, the plate 310 may be understood as the display panel 12 of the electronic apparatus 10 of FIG. 1. As understood by a person of ordinary skill in the art, the plate 110 may have a flat panel shape but is not limited thereto. For example, the plate 310 may have a curved panel shape.

The plurality of exciters 320 are disposed in the neighborhood of the circumference of the plate 310 and excite the plate 310. The plurality of exciters 320 may be attached close to a boundary portion of the plate 310 to form a single closed curve and form a single exciter array. For example, the plurality of exciters 320 may be attached on a boundary or locations very close to the boundary of the backside of the display panel 12 of the electronic apparatus described with reference to FIG. 1 such that an inner space is completely surrounded by the plurality of exciters 320. The plurality of exciters 320 may be, for example, piezoelectric elements. The driving controller 390 drives the plurality of exciters 320 so that the plurality of exciters 320 vibrate at the substantially same excitation frequency. The driving controller 390 may drive each of the plurality of exciters 320 independently so that amplitudes and phases of the plurality of exciters 320 are different from each other.

Figure 16:
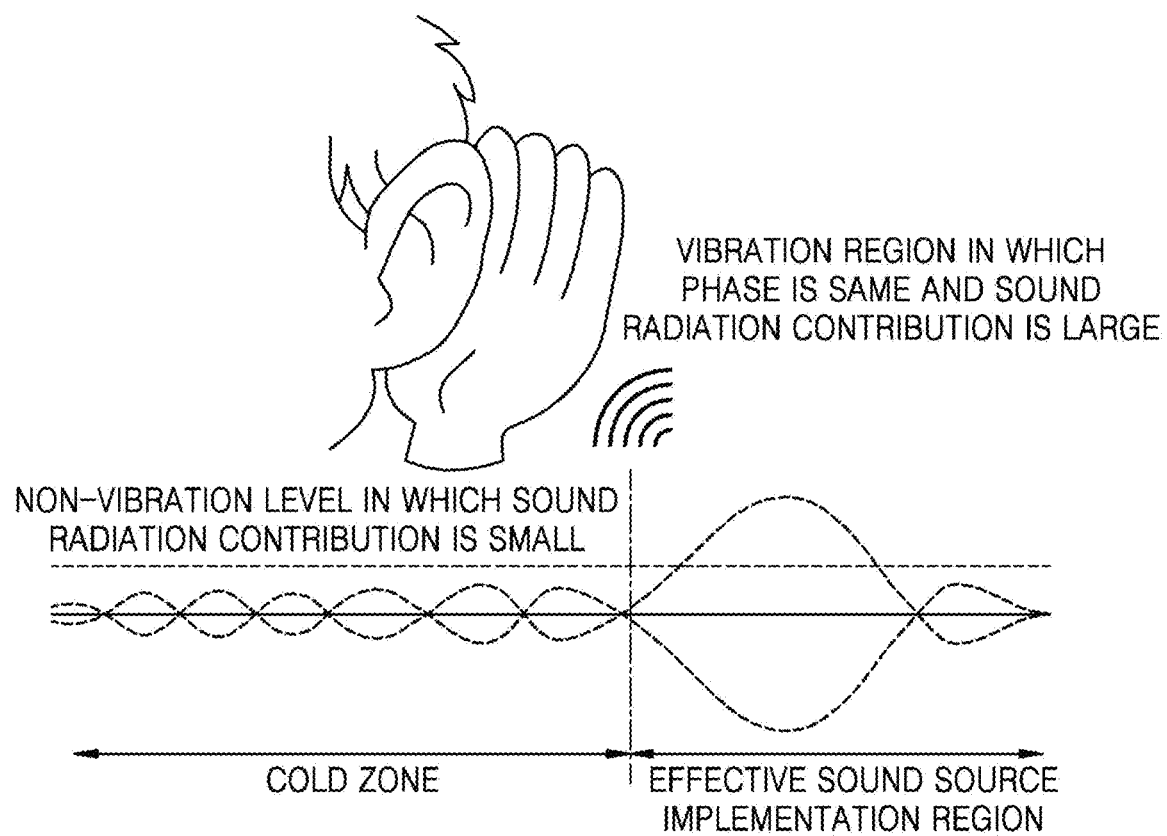
FIGS. 16 and 17 are diagrams illustrating an operation of forming a localized vibration field at the apparatus for forming the localized vibration field of FIG. 15.
Figure 17:
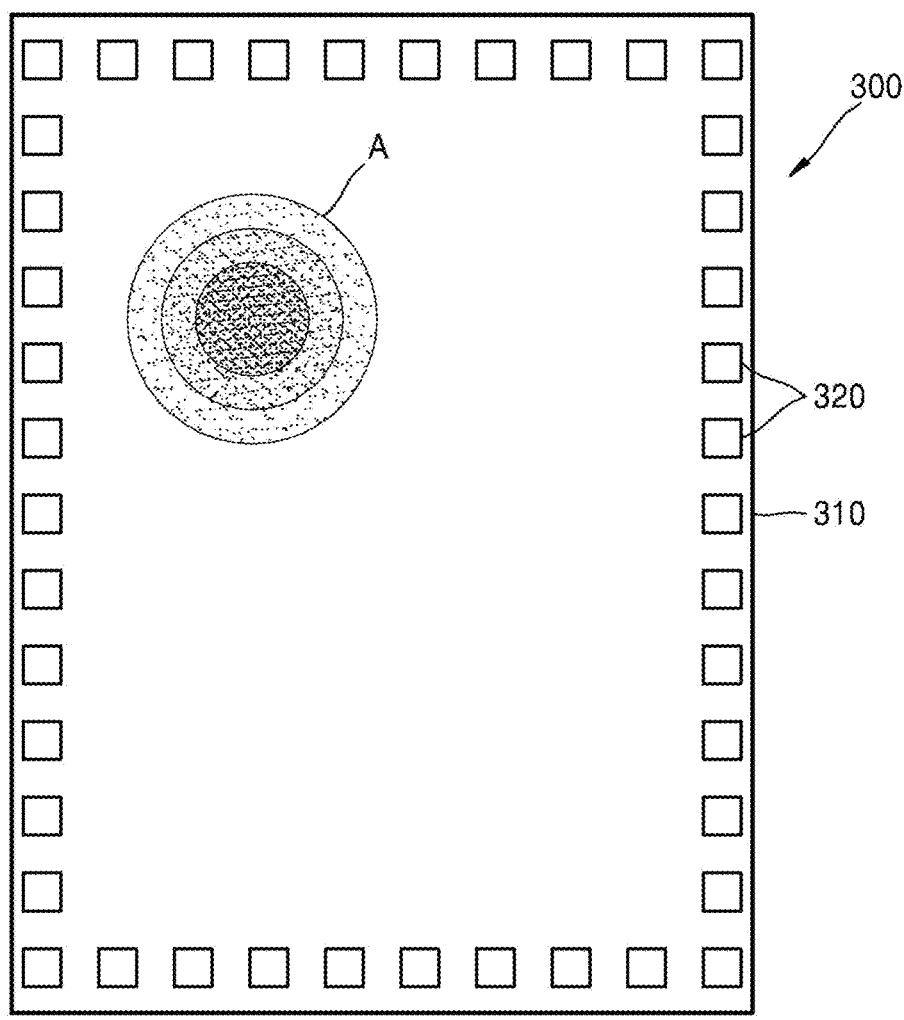

FIGS. 16 and 17 are diagrams illustrating an operation of forming a localized vibration field at the apparatus 300 for forming the localized vibration field. A single mode vibration in which a phase is constant is induced in a specific local sound source region to which sounds are to be radiated, and excitation is not allowed in the other regions. The cold zone may be understood as a baffle of a speaker. A person of ordinary skill in the art would understand that a sound source-forming region at the plate 110 may be generated at various locations via appropriate arrangement of the exciters 320 and an input signal like the embodiment described with reference to FIGS. 1 to 14.

Figure 18A:
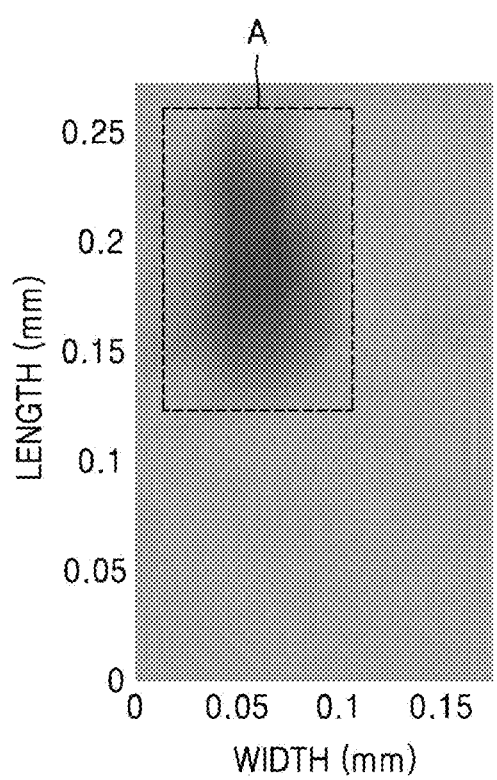
FIGS. 18A and 18B are graphs illustrating amplitude and phase characteristics of a localized vibration field formed by the apparatus for forming the localized vibration field of FIG. 15.
Figure 18B:
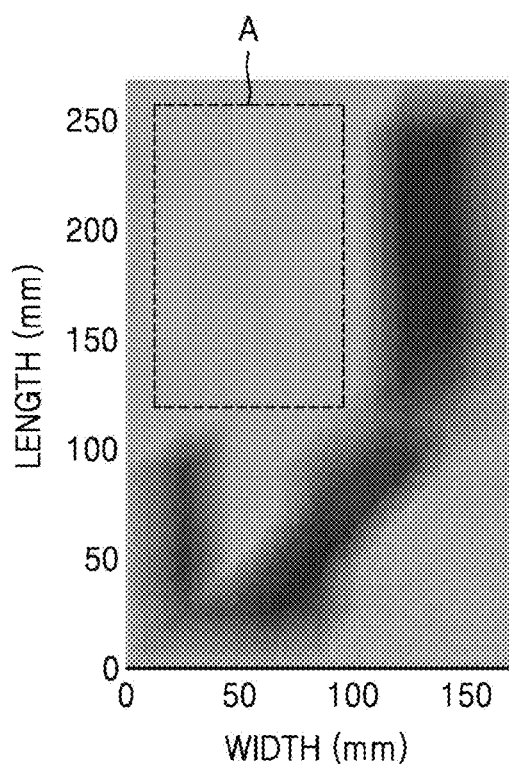

FIGS. 18A and 18B are graphs illustrating amplitude and phase characteristics of a localized vibration field formed by the apparatus 300 for forming the localized vibration field according to an embodiment. Referring to FIG. 18A, it is known that vibration occurs only at a region A. Also, referring to FIG. 18B, it is known that the vibration at the region A has the same phase.

A user may feel an effect as if sounds directly came out from the plate 310 by using the apparatus 300 for forming the localized vibration field according to an embodiment. A location S of a sound source inside the plate 310 may be changed by differing an input electric signal to the array of the exciters 320. Since an additional speaker unit is not required, space efficiency improves. A limitation characteristic of a low frequency sound is determined by a size of a sound source. Since the apparatus 300 for forming the localized vibration field according to an embodiment uses a sound source of a wide region, mid/low frequency sounds, which have been difficult to provide due to apparatus structure arrangement in the related art, may be implemented. That is, the apparatus 300 for forming the localized vibration field according to an embodiment is applied to the display panel 12 of the electronic apparatus 10, so that mid/low frequency sounds may be provided to a specific local region within the display panel 12, and vibration generation is suppressed in the other regions. Therefore, sound radiation efficiency improves and distortion reduces and thus natural and excellent sounds may be provided to a user.

Though the apparatus and method of forming the localized vibration field, and the method of disposing exciters according to the embodiments have been described with reference to the embodiments illustrated in the drawings, for understanding, it will be understood by those of ordinary skill in the art that various changes in form and details may be made therein without departing from the spirit and scope of the exemplary embodiments as defined by the following claims.

What is claimed is:

1. An apparatus for forming a localized vibration field, the apparatus comprising:
   a plate;
   a plurality of exciters disposed around a circumference of the plate and configured to excite the plate at a substantially same excitation frequency, wherein the plate vibrates in the form of standing waves; and
   a driving controller configured to set a location of a local region of the plate by independently controlling both of an amplitude and a phase of each of the plurality of exciters, wherein the local region of the plate is vibrated and vibrations of a region outside the local region of the plate are suppressed,
   wherein the plurality of exciters are configured to excite the local region with a vibration energy greater than a vibro-tactile threshold, and to excite the region outside the local region of the plate with a vibration energy less than the vibro-tactile threshold, and
   wherein the plurality of exciters are disposed at a node of vibration of the plate.

2. The apparatus of claim 1, wherein the plurality of exciters are configured to excite the local region with a vibration energy substantially greater than the vibro-tactile threshold by about 2 dB or more, and excite the region outside the local region with a vibration energy substantially less than the vibro-tactile threshold by about 2 dB or more.

3. The apparatus of claim 1, wherein the plurality of exciters are configured to excite the local region of the plate with a vibration energy substantially greater than a vibration energy of the region outside the local region of the plate by about 4 dB or more.

4. The apparatus of claim 1, wherein the plurality of exciters are configured to excite the plate so as to vibrate the local region at a mid-range or a low-range frequency from among an audible frequency band.

5. The apparatus of claim 1, wherein the plurality of exciters are configured to excite the plate such that the local region vibrates in a single mode having a constant a phase.

6. The apparatus of claim 1, wherein the plurality of exciters comprise at least one of moving coil exciters, piezoelectric exciters, and off-center weight motors.

7. The apparatus of claim 1, wherein the plate comprises a flat panel-type member or a curved panel-type member.

8. The apparatus of claim 1, wherein the plate comprises a display panel or a housing of an electronic apparatus.

9. A method of forming a localized vibration field, the method comprising:
   disposing a plurality of exciters around a circumference of a plate; and
   exciting the plate by vibrating the plurality of exciters at a substantially same excitation frequency, wherein the plate vibrates in the form of standing waves;
   setting a location of a local region of the plate by independently controlling both of an amplitude and a phase of each of the plurality of exciters, wherein the local region of the plate is vibrated and vibrations of a region outside the local region of the plate are suppressed; and
   exciting the local region with a vibration energy greater than a vibro-tactile threshold, and exciting the region outside the local region of the plate with a vibration energy less than the vibro-tactile threshold,
   wherein the plurality of exciters are disposed at a node of vibration of the plate.

10. The method of claim 9, further comprising:
    exciting the local region with a vibration energy substantially greater than the vibro-tactile threshold by about 2 dB or more, and exciting the region outside the local region with a vibration energy substantially less than the vibro-tactile threshold by about 2 dB or more.

11. The method of claim 9, further comprising:
    exciting the plate so as to vibrate the local region at a mid-range or a low-range frequency from among an audible frequency band.

12. The method of claim 9, further comprising:
    exciting the plurality of exciters to induce a single mode vibration having a constant phase in the local region.

13. A method of disposing exciters, which vibrate a local region of a plate by exciting the plate, around a circumference of the plate, the method comprising:
    exciting a plurality of candidate locations around the circumference of the plate at a uniform excitation frequency, wherein the plate vibrates in the form of standing waves;
    selecting independent candidate locations with respect to a localized vibration of the plate by calculating a correlation between the localized vibration of the plate and vibrations at the plurality of candidate locations; and
    disposing the exciters at the selected independent candidate locations,
    wherein a location of the local region of the plate is set by independently controlling both of an amplitude and a phase of each of the plurality of exciters,
    wherein the local region of the plate is vibrated and vibrations of a region outside the local region of the plate is suppressed, and
    wherein the plurality of exciters are disposed at a node of vibration of the plate.

14. The method of claim 13, wherein the correlation between the localized vibration of the plate and the vibrations at the plurality of candidate locations is calculated by using an effective independence method (EfI).

15. The method of claim 13, wherein the independent candidate locations with respect to the localized vibration of the plate are selected based on an achievement value set based on human tactile information.

* * * * *